Jan. 12, 1943.        B. E. SHAW        2,308,313
REFRIGERATION CONTROL STRUCTURE
Filed Nov. 4, 1940        2 Sheets-Sheet 1
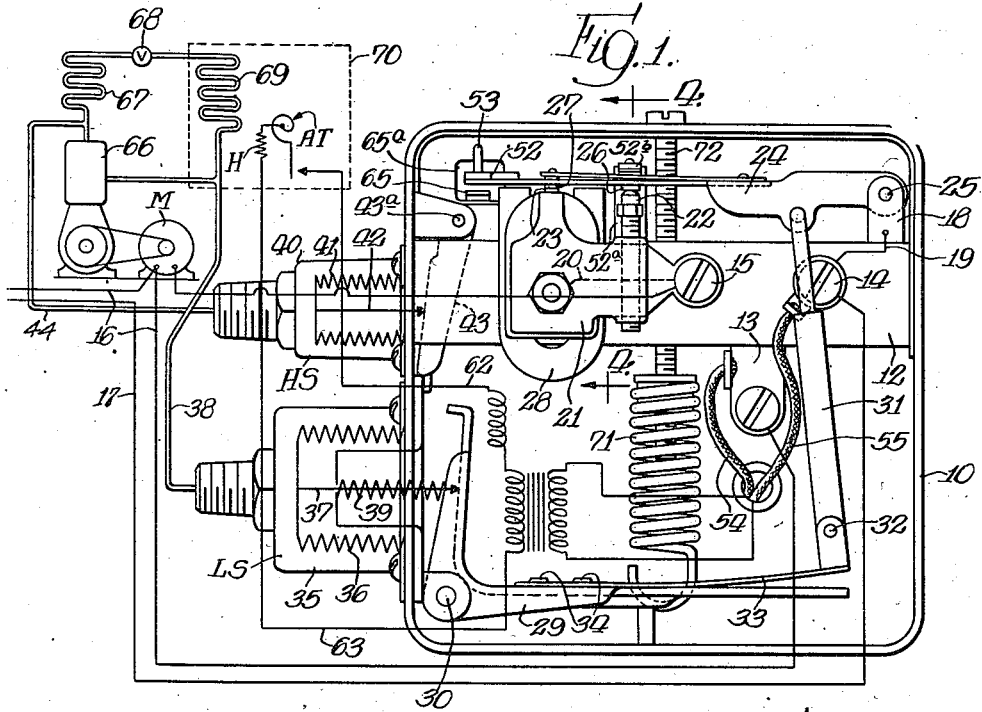
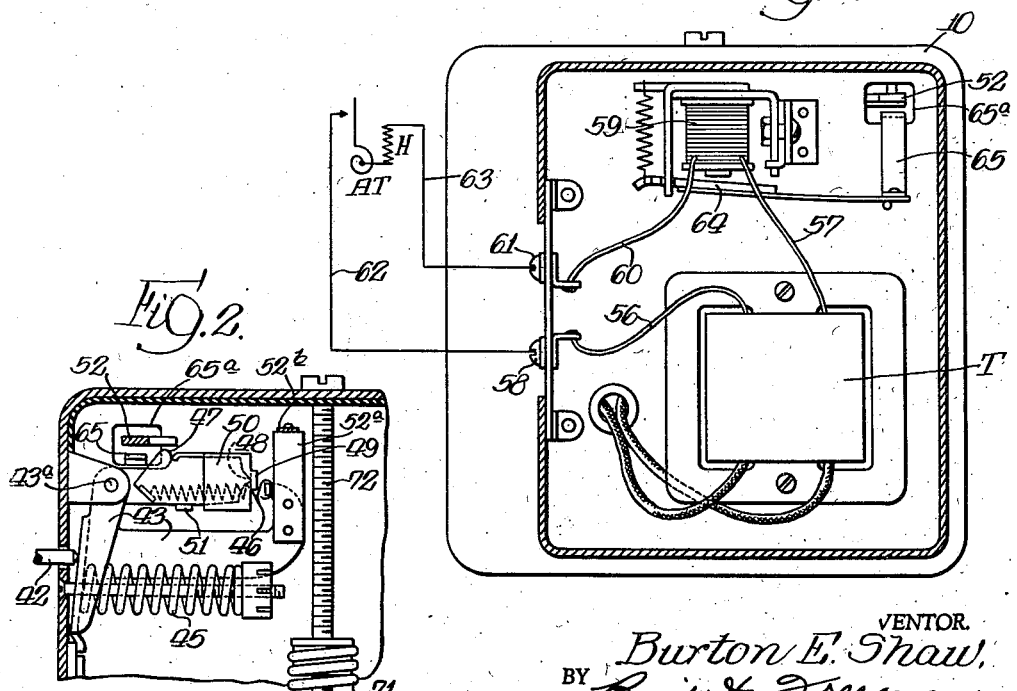
INVENTOR.
Burton E. Shaw
BY Bair & Freeman
Attys Jan. 12, 1943.　　　B. E. SHAW　　　2,308,313
REFRIGERATION CONTROL STRUCTURE
Filed Nov. 4, 1940　　　2 Sheets-Sheet 2
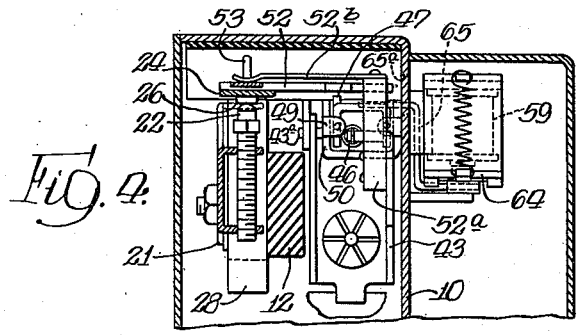
INVENTOR.
Burton E. Shaw,
BY Bair & Freeman
Attys.

Patented Jan. 12, 1943

2,308,313

UNITED STATES PATENT OFFICE 2,308,313

REFRIGERATION CONTROL STRUCTURE

Burton E. Shaw, Bristol, Ind., assignor to Penn Electric Switch Co., Goshen, Ind., a corporation of Iowa Application November 4, 1940, Serial No. 364,270

13 Claims. (Cl. 62—4)

My present invention relates to a refrigeration control structure of that type which includes an electric switch for controlling the refrigerant compressor motor of a mechanical refrigeration system.

One object of the invention is to provide a simple and inexpensive switch structure so designed as to have mechanisms which are responsive to air temperature in the space being refrigerated, as well as to low side pressure and high side pressure of the refrigerant system, with the mechanisms so related to and cooperating with each other as to secure a number of desirable operating features including defrost of the evaporator each cycle of operation of the system to secure maximum efficiency.

Another object is to provide a refrigeration control structure wherein close temperature regulation may be secured with an automatic change in the length and periodicity of the operating cycles as seasonal changes are encountered or as load conditions vary.

Still another object is to provide a control structure which is so designed as to insure that defrosting of the evaporator coil of the refrigeration system takes place each cycle of operation regardless of air temperature within the space being high enough to call for refrigerant compressor operation and to insure maintenance of high humidity of the air within the space being refrigerated.

A further object is to provide a high side pressure responsive device for opening the circuit through the control switch when there is an excessive high side pressure in the refrigeration system and to return the switch to cut-in position when the high side pressure recedes.

Still a further object is to provide a control structure wherein either a low side pressure responsive device, an air temperature responsive device or a high side pressure responsive device may effect movement of the control switch to its cut-out position, each independent of the others, with cut-in of the switch, however, being predicated upon two of the devices being in their cut-in positions when the third one assumes its cut-in position.

Other objects, purposes and characteristic features of the present invention will be in part obvious from the accompanying drawings and in part pointed out as the description of the invention progresses. In describing the invention in detail, reference will be made to the accompanying drawings in which like reference characters designate corresponding parts throughout the several views, and in which Figure 1 is a front elevation of a control structure embodying my invention, the cover of the structure being removed and a refrigeration system as well as the electrical wiring being shown diagrammatically.

Figure 2 is a view of the upper left hand corner of the control structure with parts of Figure 1 removed to show other parts behind the removed parts.

Figure 3 is a rear elevation of my switch structure with a casing for a transformer and relay shown in section.

Figure 4 is a sectional view on the line 4—4 of Figure 1.

Figure 5 is a diagrammatic view of the control structure showing the parts in the position assumed when air temperature effects cut-out of the switch structure.

Figure 6 is a similar diagrammatic view showing the position of the parts when low side pressure effects cut-out of the switch structure, and Figure 7 is a similar diagrammatic view showing the position of the parts when the high side pressure responsive device effects cut-in of the switch structure.

On the accompanying drawings, a casing 10 is provided in which is mounted a bar 12 of insulating material. On the bar 12, terminals 13, 14 and 15 are located. The terminals 13 and 14 are adapted for connection with current supply wires 16 and 17. The terminal 14 is electrically connected with a bracket 18, as indicated at 19, and the bracket is supported on the insulating bar 12. The terminal 15 is connected as by a wire 20 with a contact bracket 21 carrying contacts 22 and 23. A switch arm 24 is pivoted at 25 to the bracket 18 and carries contacts 26 and 27 for coaction respectively with the contacts 22 and 23. A magnet 28 is mounted on the bar 12 and cooperates with the switch arm 24 to secure snap action for the contacts 22, 23, 26 and 27.

For normally operating the switch arm 24, I provide a bell crank 29 pivoted at 30 and operatively connected to the switch arm 24 by a link 31. The link 31 is pivoted at 32 to a leaf spring 33 having one end connected as at 34 to the bell crank 29. A low side pressure responsive device LS is provided in the form of a stationary housing 35 for a bellows 36 having an operating stem 37 coacting with the bell crank 29. Low side pressure is adapted to be introduced through a tube 38 to the bellows chamber 35 and a spring 39 opposes suction in the tube 38 tending to expand the bellows.

A high side pressure responsive device HS is also provided which includes a bellows housing 40 for a bellows 41. The bellows 41 operates a stem 42 bearing against a bell crank lever 43 pivoted at 43$^a$. Collapse of the bellows 41 by pressure introduced through a tube 44 is opposed by a spring 45. The bell crank lever 43 has connected thereto a toggle spring 46 which in turn is connected to a toggle lever 47, see Fig. 2. The lever 47 is provided with knife points 48 pivoting on a cross member 49 of a bracket 50. The toggle lever 47 is adapted to move away from a stop 51 and engage a lateral extension 52 of the switch arm 24 when the upper left end of the bell crank lever 43 moves upwardly, so that the toggle spring 46 passes the pivot center at 48—49. The toggle lever 47 thereby effects movement of the switch arm 44 to cut-out position with a stop pin 53 thereof engaging the casing 10, as shown by dotted lines in Figure 7. The bell crank 43$^a$ carries an arm 52$^a$ of insulating material, with which is connected a leaf spring 52$^b$. The leaf spring 52$^b$ is adapted to contact at times with the switch lever 24 and tends to urge it toward cut-in position.

On the back of the casing 10, I mount a transformer T and run wires 54 and 55 from the terminals 13 and 14 to the primary thereof. Wires 56 and 57 extend from the secondary of the transformer T to a terminal 58 and one end of a relay coil 59, respectively. Another wire 60 extends from the relay coil to a second terminal 61. The terminals 58 and 61 are connected by wires 62 and 63 to an air thermostat AT. An anticipating heater H is in series circuit with the air thermostat and the heat therefrom is adapted to modify the action of the air thermostat so as to reduce its differential of operation.

Pivotally associated with the relay coil 59 is an armature 64 having an extension 65. The extension 65 is adapted to engage the extension 52 of the switch arm 54 whenever the relay coil 59 is energized and to lift the extension 52 and thereby move the switch arm to its cut-out position, as shown in Figure 5.

The refrigeration system in which my control structure is installed includes a refrigerant compressor 66, a refrigerant compressor motor M, a condenser coil 67, an expansion valve 68 and an evaporator coil 69. The evaporator coil 69 is mounted on a cooler or box 70 wherein the air thermostat AT is located so as to be responsive to the temperature of the air in the space being refrigerated.

PRACTICAL OPERATION

*Low side cut-in (Figure 1)*

In Figure 1, I show the positions of the parts of my switch structure as a result of low side refrigerant pressure effecting cut-in of the switch. The contacts 22, 23, 26 and 27, it will be noted, are in engagement so that the compressor motor M is energized. Prior to cut-in position being assumed, the parts would have been in the positions illustrated in Figure 6. The low side pressure in the tube 38, upon increasing because of an idle period of the refrigerant system and a consequent rise in temperature of the system, will move the bell crank 29 from its cut-out position (indicated as CO at the right hand end of the bell crank 29) to its cut-in position (indicated at CI). The leaf spring 33 is normally sprung some distance from the long arm of the bell crank 29, as in Figure 6, and upon swinging of the arm from cut-out position to cut-in position the switch arm 24 will be moved from contact with the high side cut-in spring 52$^b$ so that the switch or armature arm 24 is in a stronger field of the magnet 28 and is accordingly attracted by the magnet. The switch will thereupon move from a position intermediate its cut-out and cut-in positions (indicated as CO at the left end of the switch arm) to its cut-in position (indicated at CI). The leaf spring 33 will thereby be bent to a position closer to the bell crank 29, as shown in Figure 1.

The setting of the low side bellows 36 is accomplished in a normal manner by a range spring 71 and an adjusting screw 72. This setting is preferably made so that cut-in of the switch arm 24 occurs only after the evaporator 69 has been defrosted or has been raised in temperature to above 32° Fahr. Thus I am assured of defrosting each cycle of operation of the refrigerant system so as to secure maximum efficiency in the operation of the system.

*Air temperature cut-out (Figure 5)*

After the switch structure has cut in, in response to a predetermined increase in low side pressure (as in Figure 1), it will eventually cut out in response to a lowering of the low side pressure, but before that time (since the low side bellows has a relatively wide differential of operation), the switch structure will cut out as a result of predetermined reduction of air temperature in the refrigerated space 70 acting upon the air thermostat AT. The thermostat will close, as in Figure 5, thereby energizing the electromagnet 59 to attract the armature 64 and through the extensions 65 and 52 of the armature 64 and the switch arm 24, respectively, will effect raising of the switch arm to cut-out position. The magnet 59 is of sufficient strength to overcome any tendency of the low side pressure bellows 36 through the spring 33 to keep the switch in cut-in position and to overcome the tension of the high side pressure cut-in spring 52$^b$ by flexing the springs 33 and 52$^b$ upwardly as shown.

The cut-out position of the switch will not be long maintained, however, since I have provided the anticipating heater H to reduce the differential of operation of the thermostat AT to a minimum. In other words, as soon as the coil 59 is energized the heater H is also energized to add a few degrees of heat to the thermostat AT, thus tending to immediately open it or at least open it as soon as the air temperature rises a fraction of a degree. This will cause short cycling of the refrigerant system possibly two or three times before low side cut-out operation occurs, thus maintaining a desired high humidity condition in the space being refrigerated. Thus a relatively constant temperature can be maintained in the air space within the refrigerator.

*Low side cut-out (Figure 6)*

After a few cycles of operation during the time that the low side responsive device LS remains in cut-in position and as determined by operations of the thermostat AT, the pressure in the low side tube 38 will recede to a point where it effects cut-out of the switch. The bell crank 29 is shown at cut-out position and previous to assuming such position it would have compressed or bent the spring 33 downwardly while the switch arm 24 was held in cut-in position by the magnet 28 until the tension in the spring 33 overcame the pull of the magnet. The switch arm 24 would then pull upwardly and be stopped by the high side cut-in spring 52b. The evaporator will now warm up until it is defrosted, whereupon during normal operations the low side cut-in position of Figure 1 will occur and the cycle of operations thus far described will be repeated. Sometimes, of course, such as when the refrigerated space 70 is left open for a considerable percentage of the time, there might not be any cut-out operation of the switch structure in response to the thermostat AT, in which case cut-out would occur due to decrease in low side pressure following cut-in in response to low side pressure.

*High side cut-in (Figure 7)*

In the event that a dangerously high pressure is developed in the high side of the refrigerant system, such pressure will act upon the high side bellows HS and in an obvious manner will swing the bell crank 43 counterclockwise to cause the toggle spring 46 to pass dead center and throw the arm 47 upwardly as to the dotted position shown in Figure 7. Subsequently, when the excessively high pressure recedes, the bell crank 43 will snap from its cut-out position to its initial position of Figure 2, thereby permitting the arm 47 to lower to its initial position and the cut-in spring 52b to engage the switch arm 24 and move it toward cut-in position. The air thermostat AT of course must be open in order for such operation to occur and the low side pressure responsive device LS must be in position permitting cut-in before the spring 52b can move the switch arm 24 to a position where it will be attracted by the magnet 28 and moved to its cut-in position. If the air thermostat is closed, or if the low side pressure responsive device is not in cut-in position, then the switch arm will remain with its switch contacts separated until such time as the air thermostat is opened or the low side pressure responsive device does move to cut-in position.

The results obtained by a structure of the kind herein disclosed are very desirable in connection with refrigeration, especially for butcher boxes and "walk in" coolers. Defrosting each cycle is insured due to low side cut-in at a temperature above the defrosting temperature. One of the desirable advantages of defrosting each cycle is to insure high humidity to avoid dehydration of the products being preserved in the refrigerator. This is especially desirable in connection with meats, to prevent loss by shrinkage. Frequent cycles and close temperature regulation is assured by the use of an air thermostat and the use of an anticipating heater to minimize its differential of operation. At the same time, high side pressure at excessive or dangerous values is guarded against, with return of the control structure to automatic operation after the high side pressure has receded to normal without the necessity of requiring a service man to reset the high side pressure responsive safety device. The responsive devices acting to control the switch arm effect a compensation for seasonal changes and load variations so that substantially the desired operating characteristic is obtained during all periods of operation.

Having described one specific embodiment of my invention together with the operation thereof, I desire it to be understood that this form is selected merely for the purpose of facilitating disclosure of the invention rather than for the purpose of limiting the number of forms which it may assume. It is to be further understood that various modifications, adaptations and alterations may be applied to the specific form disclosed to meet the requirements of practice without in any manner departing from the spirit and scope of the present invention except as set forth in the claims appended hereto.

I claim as my invention and desire to secure by Letters Patent of the United States:

1. In a refrigeration control structure, a switch arm having cut-in and cut-out positions, an electromagnet to move said switch arm to cut-out position when said electromagnet is energized, switch contacts controlled by said switch arm and connected in circuit with a refrigerant compressor motor, means responsive to low side pressure of the refrigerant system and operable to move said switch arm to cut-out position and to cut-in position, the setting of said low side pressure responsive means being such that it moves the switch arm to cut-in position only after the evaporator coil of the refrigerator system has been defrosted, an air thermostat responsive to the temperature of air in the space being refrigerated and controlling said electromagnet to energize it when said thermostat responds to a predetermined low temperature of the air space in the refrigerator, said thermostat including an anticipating heater for reducing the differential of operation of said air thermostat, and means responsive to the high side refrigerant pressure for moving said switch arm to cut-out position at any time independent of said electromagnet and of said low side pressure responsive means, said last means including a spring arm engageable with said switch arm to move it to cut-in position when said high side pressure responsive means returns to normal position if said electromagnet is deenergized and said low side pressure responsive device is in cut-in position.

2. In a refrigeration control structure, a switch arm, an electromagnet for moving said switch arm to cut-out position, a switch in circuit with a refrigerant compressor motor and controlled by said switch arm, means responsive to low side pressure of the refrigerant system and operable to move said switch arm to cut-in position if said electromagnet is de-energized, said electromagnet upon energization moving said switch arm to cut-out position independent of said low side pressure responsive means, said low side pressure responsive means effecting movement of the switch arm to cut-in position only after defrosting of the evaporator coil has occurred, and an air thermostat responsive to the temperature of air in the space being refrigerated and controlling said electromagnet.

3. In a refrigeration control structure, a switch arm having cut-in and cut-out positions, an electromagnet to move said switch to cut-out position when energized, said switch arm being connected in circuit with a refrigerant compressor motor, means responsive to low side pressure of the refrigerant system and operable to move said switch arm to cut-out position and to cut-in position, an air thermostat responsive to the temperature of air in the space being refrigerated and controlling said electromagnet to energize it when said thermostat responds to a predetermined low temperature of the air space in the refrigerator, said thermostat including an anticipating heater for said thermostat and connected in its circuit, and means responsive to the high side refrigerant pressure for moving said switch arm to cut-out position at any time independent of said electromagnet and said low side pressure responsive means.

4. A refrigeration control structure comprising a switch, an electromagnet for moving said switch to cut-out position, said switch being in circuit with a refrigerant compressor motor, means responsive to low side pressure of the refrigerant system and operable to move said switch to cut-in position if said electromagnet is de-energized, said electromagnet upon energization moving said switch to cut-out position independent of said low side pressure responsive device, and an air thermostat responsive to the temperature of air in the space being refrigerated and controlling said electromagnet.

5. A refrigerant system control comprising a switch in circuit with a refrigerant compressor motor, a plurality of devices responsive respectively to low side refrigerant pressure, to air temperature in the space being refrigerated and to high side refrigerant pressure, said first device being operable to move said switch arm to cut-out position independent of said last two devices and operable to move said switch arm to cut-in position only after defrosting of the evaporator has occurred and providing said other two devices are in cut-in position, said second and third devices being operable to move said switch arm to cut-out position independent of each of the other devices, said second device comprising a thermostat including an anticipating heater and an electromagnet controlled by said thermostat to move said switch arm to cut-out position, and said third device including means to return said switch arm to cut-in position providing the other two devices are in their cut-in positions.

6. A switch structure for a refrigerant system comprising a switch arm, a magnet tending to move said switch arm to cut-in position, an electromagnet operable when energized to move said switch arm to cut-out position, a low side pressure responsive device for operating said switch arm normally to its cut-in and cut-out positions, an air temperature responsive device for controlling said electromagnet to move the switch arm to cut-out position independent of the low side pressure responsive device, and a high side pressure responsive cut-out device for said switch arm.

7. A switch structure for a refrigerant system comprising a switch arm having cut-in and cut-out positions, a low side pressure responsive device capable of moving said switch arm to cut-in and cut-out positions, the cut-in position being effected only after defrosting of the evaporator coil of a refrigerant system wherein a refrigerant compressor motor of the system is controlled by said switch arm, an air temperature responsive device for responding to the temperature of air in the space being refrigerated, electrically operated means controlled by said air thermostat and operable when energized to move said switch arm to cut-out position, said thermostat including an anticipating heater for minimizing the differential of operation thereof, and a high side pressure responsive device operable to move said switch arm to cut-out position independent of said low side pressure responsive device and said air thermostat and electrically operated means, said high side pressure responsive device including means to return said switch arm to cut-in position if said low side pressure responsive device is in its cut-in position.

8. In a refrigerant system controller, a switch in circuit with a refrigerant compressor motor, a pair of devices responsive respectively to air temperature in the space being refrigerated and to low side refrigerant pressure, said responsive devices each being operable independent of the other one to move said switch to cut-out position, both of said responsive devices being associated with said switch so that both must be in their cut-in positions to permit movement of the switch to its cut-in position, and a pressure responsive device responding to the high side pressure of said refrigerant system and operable to move said switch to cut-out position independent of the other two responsive devices and to move it to cut-in position if said other two devices are in their cut-in positions, and electrically operated means to move said switch to cut-in position in response to said air temperature responsive means.

9. In a refrigerant system controller, a switch in circuit with a refrigerant compressor motor and having cut-in and cut-out positions, a first device responsive to pressure in the low side of the refrigerant system, a second device responsive to pressure in the high side of the refrigerant system, a third device responsive to the temperature of air in the space being refrigerated by said refrigerant system, said first, second and third devices being operatively connected with said switch to effect cut-out thereof upon movement of any of the three devices to its cut-out position and to effect cut-in of the switch only when all three devices are in their cut-in positions, said third device including an electromagnet for moving the switch to cut-out position, a thermostat in the space being refrigerated, and an anticipating heater for said thermostat to reduce the differential of operation thereof.

10. In a refrigerant system controller, a switch in circuit with a refrigerant compressor motor, a first device responsive to pressure in the low side of the refrigerant system, a second device responsive to pressure in the high side of the refrigerant system, a third device responsive to the temperature of air in the space being refrigerated by said refrigerant system, said first, second and third devices being operatively connected with said switch to effect cut-out thereof upon movement of any of the three devices to its cut-out position and to effect cut-in of the switch only when all three devices are in their cut-in positions, said third device including an electromagnet for moving the switch to cut-out position, and a thermostat in circuit therewith and located in the space being refrigerated.

11. In a switch structure, a switch arm, a magnet tending to move said switch arm to cut-in position, an electromagnet operable when energized to move said switch arm to cut-out position, a refrigerant system low side pressure responsive device for operating said switch arm normally to its cut-out position and to its cut-in position only after defrosting of the evaporator coil of the refrigerant system, a refrigerated space air thermostat for controlling said electromagnet to move the switch arm to cut-out position independent of the low side pressure responsive device, and a refrigerant system high side pressure responsive cut-out device for said switch arm operating independent of said low side pressure responsive device.

12. A refrigeration control structure comprising a switch arm, a low side pressure responsive device for normally operating said switch arm, a high side pressure responsive device for moving said switch arm to cut-out position upon the occurrence of an excessively high pressure in the refrigerant system, an air thermostat device, an electromagnet energizable by closure of said air thermostat device and thereupon operable to move said switch arm to cut-out position independent of said low side pressure responsive device upon reduction of the air temperature in the space being refrigerated to a predetermined setting of said air thermostat device, either of said first two devices or said third device through said electromagnet being capable of moving said switch arm to cut-in position only if the other two devices are in their cut-in positions.

13. A refrigeration control structure comprising a switch arm, a low side pressure responsive device for normally operating said switch arm, a high side pressure responsive device for moving said switch arm to cut-out position upon the occurrence of an excessively high side pressure in the refrigerant system, said high side pressure responsive device including means to return said switch arm to cut-in position only if said low side pressure responsive device is in cut-in position, an air temperature responsive device, an electromagnet operable upon energization to move said switch arm to cut-out position independent of said low side pressure responsive device, said air temperature responsive device, upon reduction of air temperature in the space being refrigerated to a predetermined setting thereof, energizing said electromagnet; said low side pressure responsive device, said high side pressure responsive device and said electromagnet each being capable of moving said switch arm to cut-in position only if the other two are in their cut-in positions.

BURTON E. SHAW.

DISCLAIMER 2,308,313.—*Burton E. Shaw*, Bristol, Ind. REFRIGERATION CONTORL STRUCTURE. Patent dated Jan. 12, 1943. Disclaimer filed May 14, 1945, by the inventor; the assignee, *Penn Electric Switch Co.*, consenting.

Hereby enters this disclaimer to claim 10 of said specification.

[*Official Gazette June 26, 1945.*]